(12) United States Patent
Li et al.

(10) Patent No.: US 9,971,765 B2
(45) Date of Patent: May 15, 2018

(54) REVISING LANGUAGE MODEL SCORES BASED ON SEMANTIC CLASS HYPOTHESES

(71) Applicant: Nuance Communications, Inc., Burlington, MA (US)

(72) Inventors: Weiying Li, Cupertino, CA (US); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 143 days.

(21) Appl. No.: 14/276,304

(22) Filed: May 13, 2014

(65) Prior Publication Data

US 2015/0332673 A1 Nov. 19, 2015

(51) Int. Cl.
| | | |
|---|---|---|
| G10L 15/22 | (2006.01) |
| G06F 17/27 | (2006.01) |
| G10L 15/18 | (2013.01) |
| G10L 15/26 | (2006.01) |
| G10L 15/197 | (2013.01) |

(52) U.S. Cl.
CPC ........ *G06F 17/2785* (2013.01); *G06F 17/276* (2013.01); *G06F 17/2715* (2013.01); *G10L 15/1815* (2013.01); *G10L 15/197* (2013.01); *G10L 15/26* (2013.01)

(58) Field of Classification Search
CPC ....... G10L 15/00; G10L 15/26; G10L 15/183; G10L 15/197
USPC .......................................................... 704/238
See application file for complete search history.

(56) References Cited

U.S. PATENT DOCUMENTS

| | | | | |
|---|---|---|---|---|
| 5,613,037 A | * | 3/1997 | Sukkar | G10L 15/142 704/251 |
| 9,324,323 B1 | * | 4/2016 | Bikel | G10L 15/26 |
| 2006/0085186 A1 | * | 4/2006 | Ma | G10L 15/063 704/240 |
| 2007/0100618 A1 | * | 5/2007 | Lee | G10L 15/1822 704/238 |
| 2012/0323557 A1 | * | 12/2012 | Koll | G06F 17/276 704/8 |

* cited by examiner

*Primary Examiner* — Shreyans Patel
(74) *Attorney, Agent, or Firm* — Wolf, Greenfield & Sacks, P.C.

(57) ABSTRACT

Techniques for improved speech recognition disclosed herein include applying a statistical language model to a free-text input utterance to obtain a plurality of candidate word sequences for automatic speech recognition of the input utterance, each of the plurality of candidate word sequences having a corresponding initial score generated by the statistical language model. For one or more of the plurality of candidate word sequences, each of the one or more candidate word sequences may be analyzed to generate one or more hypotheses for a semantic class of at least one token in the respective candidate word sequence. The initial scores generated by the statistical language model for at least the one or more candidate word sequences may be revised based at least in part on the one or more hypotheses for the semantic class of the at least one token in each of the one or more candidate word sequences.

20 Claims, 6 Drawing Sheets

REVISING LANGUAGE MODEL SCORES BASED ON SEMANTIC CLASS HYPOTHESES

BACKGROUND

Automatic speech recognition (ASR), as discussed herein, is the transcription, by machine, of audio speech into text. Among the various approaches to automatic speech recognition are statistically-based speech recognition techniques, often including acoustic modeling and language modeling.

An acoustic model generally is trained to analyze acoustic features of an input speech signal and generate one or more hypotheses as to the sequence of sound units that the signal contains. Depending on the acoustic model being used, the sound units may be of different lengths or levels in the hierarchy of sound sequences that make up a language. For example, some acoustic models may model words as units, and may generate one or more hypotheses of sequences of words that could match the acoustics of the speech signal. Other acoustic models may model sub-word units such as phonemes, diphones, triphones, or syllables, and may generate one or more hypotheses of sequences of these sub-word units that could match the acoustics of the speech signal. Popular types of acoustic models today include hidden Markov models (HMMs) and neural networks.

A language model generally is trained to work with an acoustic model to determine which candidate word sequences that could match the acoustics of the speech signal are most likely to be what the speaker actually said. For example, "Hello, how are you?" and "Hell low ha why uh!" might both match the acoustics of a particular speech signal in the English language, but it is much more likely that the speaker said the former sequence of words than the latter. Statistical language models are generally trained by being exposed to large corpora of text and observing the occurrence frequencies of various possible sequences of words in those training corpora. The probabilities of different word sequences learned from the training data are then applied to score the likelihood of different candidate word sequences hypothesized for an input speech signal. In this sense, statistical language models are different from fixed grammars, which are typically made up of hard-coded rules regarding which word sequences are allowable for speech recognition in a particular application. Since a statistical language model (SLM) generally assigns a likelihood or probability to a candidate word sequence based on known word sequences that have been encountered before, SLMs are typically more useful than fixed grammars for recognition of free-speech inputs, in applications where there are few, if any, restrictions on what the speaker might say. A popular form of SLM today is the N-gram language model, which approximates the probability of a longer word sequence as a combination of the probabilities of each word in the sequence in the context of the preceding N−1 words. For example, a trigram SLM might approximate the probability of "Hello, how are you?" as P(Hello|<s>,<s>)P(how|<s>,Hello)P(are|Hello,how)P(you|how,are)P(</s>|are,you), where <s> and </s> refer to sentence beginning and sentence end, respectively, and $P(w_3|w_1,w_2)$ denotes the probability of encountering word $w_3$ next after encountering word $w_1$ followed by word $w_2$.

SUMMARY

One type of embodiment is directed to a method comprising: applying a statistical language model to a free-text input utterance to obtain a plurality of candidate word sequences for automatic speech recognition of the input utterance, each of the plurality of candidate word sequences having a corresponding initial score generated by the statistical language model; for one or more of the plurality of candidate word sequences, analyzing each of the one or more candidate word sequences, using at least one processor, to generate one or more hypotheses for a semantic class of at least one token in the respective candidate word sequence; and revising the initial scores for at least the one or more candidate word sequences based at least in part on the one or more hypotheses for the semantic class of the at least one token in each of the one or more candidate word sequences.

Another type of embodiment is directed to at least one computer-readable storage medium encoded with computer-executable instructions that, when executed, perform a method comprising: applying a statistical language model to a free-text input utterance to obtain a plurality of candidate word sequences for automatic speech recognition of the input utterance, each of the plurality of candidate word sequences having a corresponding initial score generated by the statistical language model; for one or more of the plurality of candidate word sequences, analyzing each of the one or more candidate word sequences to generate one or more hypotheses for a semantic class of at least one token in the respective candidate word sequence; and revising the initial scores for at least the one or more candidate word sequences based at least in part on the one or more hypotheses for the semantic class of the at least one token in each of the one or more candidate word sequences.

Another type of embodiment is directed to apparatus comprising at least one processor and at least one processor-readable storage medium storing processor-executable instructions that, when executed by the at least one processor, cause the at least one processor to perform a method comprising: applying a statistical language model to a free-text input utterance to obtain a plurality of candidate word sequences for automatic speech recognition of the input utterance, each of the plurality of candidate word sequences having a corresponding initial score generated by the statistical language model; for one or more of the plurality of candidate word sequences, analyzing each of the one or more candidate word sequences to generate one or more hypotheses for a semantic class of at least one token in the respective candidate word sequence; and revising the initial scores for at least the one or more candidate word sequences based at least in part on the one or more hypotheses for the semantic class of the at least one token in each of the one or more candidate word sequences.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
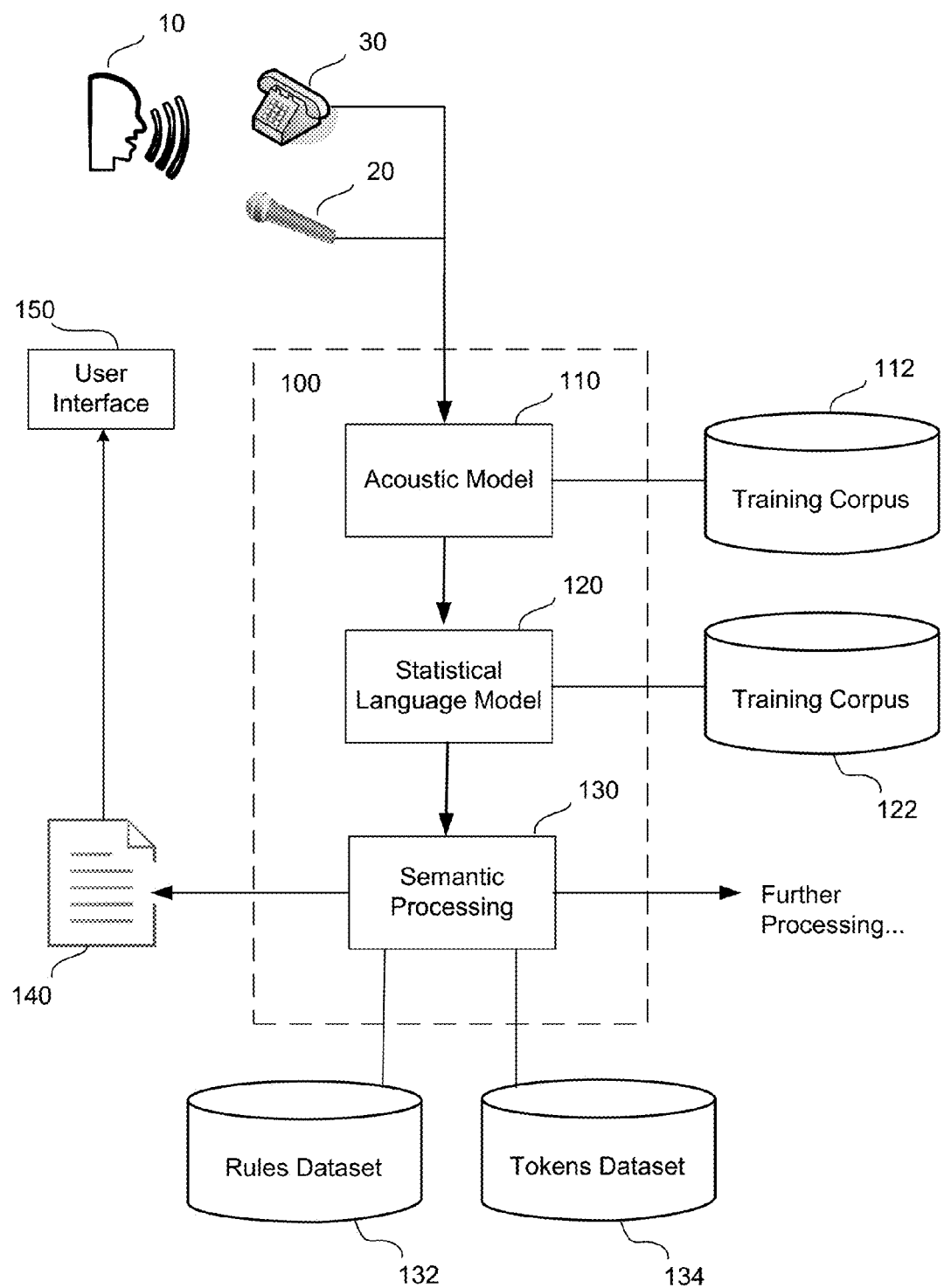
FIG. 1 is a block diagram of an exemplary operating environment for a system in accordance with some embodiments.

Some embodiments described herein relate to techniques for improved automatic speech recognition (ASR) in the context of free-speech input, such as dictation of free text. As used herein, the terms "free speech" and "free text" refer to a context for ASR in which the ASR system lacks a priori information as to the topic about which the speaker is speaking. That is, before the ASR system recognizes what words were spoken in the input utterance, it does not apply any known information about what general subject matter the user is expected to be speaking about, to narrow down the possibilities for what words the user might have spoken. This is in contrast to ASR in the context of a specific-task application, in which the topic of the input speech could be constrained such that the system can apply corresponding assumptions about what words were spoken. For example, when ASR is performed in an interactive voice response (IVR) application functioning as an automated bank teller, the system can assume that the input utterances from the user have banking-related content. The IVR system can make even more specific assumptions in the context of specific system output prompts to which specific user responses are expected. For example, when the IVR system prompts the user with, "What is your account number?" it can assume that the user's response will contain an account number, and can limit the ASR processing accordingly. A conventional IVR application may limit the space of the ASR results using a grammar that specifies a fixed set of response forms in which a user can provide an account number. If the user accidentally deviates from the system's assumption by responding, for example, "My social security number is 123-45-6789," the application might try to recognize or interpret the stated number as an account number, or might output an error message to the user because the user's response was not in the correct form for an account number.

The same is typically not true in a free-text ASR environment. The inventors have recognized that when the input context is free speech or free text, typically assumptions cannot be made about the topic of the user's speech at least until some recognition is performed on that speech. For example, when a user begins dictating an e-mail, the resulting text could be about anything, and the ASR system may be called upon to recognize any arbitrary speech that the user may provide, without applying a priori (i.e., before beginning recognition of the input) limitations on the content of the utterance. Input speech provided for ASR in this type of context in which the subject matter of the speech is unrestricted is referred to herein as "free speech," and the text resulting from ASR of free speech is referred to herein as "free text." The term "free-text" is also used herein to refer to the context in general, with "free-text input" and "free-text input utterance" referring to input speech provided in an ASR context that produces free text, even though it is understood that the input is speech and not text before the recognition is performed. In free-text ASR contexts, it may be more appropriate to use a statistical language model (SLM) rather than a fixed grammar, due to the desirability of being able to recognize arbitrary unconstrained input utterances. In some free-text ASR systems, the only limitations on what utterances are capable of being recognized may be the system's vocabulary of known recognizable words and the universe of known possible word sequences to which the SLM has been exposed in the training corpus.

Examples of free-text ASR environments include dictation, such as of an e-mail, a text message, or a document. Another example is a speech command given to a virtual agent that interfaces with multiple different specific-task applications, such as on a mobile device, in a circumstance in which the particular application to which the command is directed has not yet been identified. For example, if the first thing a smartphone user says to the device agent is, "Agent, what is on my calendar today for 2:00?" the utterance is initially a free-text input, because the system has no a priori knowledge that the user's command is to invoke the calendar application as opposed to, say, the e-mail application, the web browser application, or any other application. Only once certain words in the input have been recognized, such as "calendar," "today," and "2:00," can the agent classify the free-text input utterance as being directed toward the calendar application. As another example, a speech input can be partly a free-text utterance and partly a non-free-text utterance, as in a specific-task command that has one or more free-text fields. For instance, a user could say to a device agent, "Send text message to Bob—I'll be at the meeting in ten minutes." Assuming the text messaging application has been identified as the target specific-task application for the input command, the "Send text message to Bob" part may be processed using constrained specific-task ASR, potentially by a fixed grammar. However, the "I'll be at the meeting in ten minutes" part (i.e., the message body field of the command) is considered a free-text input utterance, because it is unconstrained and the ASR system may not have any prior information as to what it will be about. Some other non-limiting examples of free-text ASR environments include transcription of voicemails, transcription of conference recordings, dictation of comments on websites, blogs, tweets, social network posts, reviews on websites about service providers, such as hotels, airlines, banks, movies, etc.

The inventors have recognized that the free-text environment can be significantly more challenging for ASR than the specific-task application environment, because there are fewer constraints in the free-text environment on the set of possible recognition hypotheses to be evaluated. In addition, the inventors have recognized that the SLMs which, as discussed above, are best suited for performing ASR in the free-text environment may, by their nature, miss opportunities to identify semantic information that could be applied to improve the accuracy of the ASR results. For instance, consider an example in which a user is dictating a free-text document, and provides the input utterance, "I was born in 1913 in a small town near London." Because "ninety" and "nineteen" have very similar acoustics, the acoustic model (AM) may easily misrecognize "1913" as "9013." It may be clear from the semantics of the sentence that the user is speaking about the year in which he was born, and that "1913" is much more likely to be correct than "9013," but a conventional AM and SLM may not be capable of performing this type of semantic analysis. The conventional SLM only knows about probabilities of N-grams (most typically trigrams) in a training corpus, and in this particular case the SLM may be likely to prevent the misrecognition since the trigram "born in 1913" (or "born in nineteen-") is likely to have occurred in the training corpus much more frequently than the trigram "born in 9013" (or "born in ninety-"). However, consider a slightly different input utterance: "It was 1913; I was born in a small town near London." In this case, the trigram "It was nineteen" may not necessarily have been more prevalent in the training corpus than the trigram "It was ninety," since both trigrams could occur in multiple semantic contexts including contexts other than birth years. The inventors have recognized that in this type of situation in which available semantic restrictions on the possible recognition results are not captured by the SLM, errors in recognition may occur which the inventors have appreciated could be avoidable using novel techniques described herein.

The inventors have appreciated, for example, that if a token in a free-text input utterance can be assigned to a particular semantic class, the information of that semantic classification may be useful in restricting or otherwise influencing the candidate recognition results for the input utterance. For instance, in the example discussed above, if the ASR system can determine that the token for which the recognition candidates are "9013" and "1913" is a year (i.e., that the token belongs to the semantic class of years), then the system could determine that "1913" is much more likely than "9013," despite whatever probabilities the SLM may have learned for "It was ninety" and "It was nineteen." In particular, the inventors have appreciated that semantic class hypotheses may be used to revise the scores given to candidate word sequences for an input utterance by an SLM, which may result in improved recognition accuracy.

Accordingly, some embodiments described herein relate to techniques for improved speech recognition which may address one or more of the above-discussed shortcomings of traditional methods, and/or that may provide one or more of the foregoing benefits. However, embodiments are not limited to any of these benefits, and it should be appreciated that some embodiments may not provide any of the above-discussed benefits and/or may not address any of the above-discussed deficiencies that the inventors have recognized in conventional techniques.

In some embodiments, an ASR system may generate one or more hypotheses for a semantic class of one or more tokens in the candidate word sequences scored by an SLM applied to recognize an input utterance. Based at least in part on the semantic class hypotheses, the initial scores output by the SLM for the candidate word sequences may be revised. In some embodiments, the revised scores may then be used to select an output recognized word sequence for the input utterance, from among the candidate word sequences.

Exemplary techniques that may be used for analyzing a candidate word sequence to generate semantic class hypotheses, and for revising initial SLM scores based on the semantic class hypotheses, are described below. In some embodiments, semantic class hypotheses may be generated specifically for tokens in the input utterance consisting of sequences of numbers and/or letters (such as digit sequences), and exemplary techniques for detecting particular exemplary semantic classes of such sequences are described below. In some embodiments, a revised score for a candidate word sequence may account for an occurrence probability (e.g., in a training corpus) of a semantic class hypothesized for a token in the candidate word sequence, and/or for an occurrence probability of that token conditioned on the occurrence of that semantic class. In some embodiments, the initial SLM scores may merely be revised using probabilistic data; alternatively or additionally, in some embodiments one or more deterministic rules may be applied to restrict which tokens are valid for a hypothesized semantic class. In some embodiments, one or more new candidate word sequences may be generated based on the semantic class hypotheses.

It should be appreciated that the foregoing description is by way of example only, and embodiments are not limited to providing any or all of the above-described functionality, although some embodiments may provide some or all of the functionality described herein.

The embodiments described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for the techniques described herein is for use in a system for recognizing speech. An exemplary operating environment for such a system is illustrated in FIG. 1. The exemplary operating environment includes an automatic speech recognition (ASR) system 100, which may be implemented in any suitable form, as embodiments are not limited in this respect. For example, ASR system 100 may be implemented as a single stand-alone machine, or may be implemented by multiple distributed machines that share processing tasks in any suitable manner. ASR system 100 may be implemented as one or more computers; an example of a suitable computer is described below. In some embodiments, ASR system 100 may include one or more tangible, non-transitory processor-readable storage devices storing processor-executable instructions, and one or more processors that execute the processor-executable instructions to perform the functions described herein. The storage devices may be implemented as computer-readable storage media encoded with the instructions; examples of suitable computer-readable storage media are discussed below.

As depicted, exemplary ASR system 100 includes an acoustic modeling (AM) component 110, a statistical language modeling (SLM) component 120, and a semantic processing component 130. Each of these processing components of ASR system 100 may be implemented in software, hardware, or a combination of software and hardware. Components implemented in software may comprise sets of processor-executable instructions that may be executed by the one or more processors of ASR system 100 to perform the functionality described herein. Each of AM component 110, SLM component 120, and semantic processing component 130 may be implemented as a separate component of ASR system 100, or any combination of these components may be integrated into a single component or a set of distributed components. In addition, any one of AM component 110, SLM component 120, and semantic processing component 130 may be implemented as a set of multiple software and/or hardware components. It should be understood that any such component depicted in FIG. 1 is not limited to any particular software and/or hardware implementation and/or configuration.

As illustrated in FIG. 1, in some embodiments a user 10 may input a speech utterance (e.g., a free-text input utterance) to ASR system 100 using any suitable input device, examples of which include microphone 20 and telephone interface 30. The user and the input device(s) may be located local to or remote from ASR system 100, and the electronic signal representing the input utterance may be transmitted to ASR system 100 in any suitable way, such as via a local cable, via any suitable wired and/or wireless network connection(s), or via one or more storage media on which the input utterance may be stored and then accessed by ASR system 100.

In some embodiments, the input utterance received by ASR system 100 may first be processed by AM component 110, which may implement one or more acoustic models trained on a large training corpus 112 of recorded speech. Although training corpus 112 is illustrated in the embodiment of FIG. 1 as being connected to and accessible by AM component 110, this is not required. For example, in some embodiments, the AM may be trained elsewhere before being loaded onto ASR system 100, and may not have continued access to training corpus 112 from ASR system 100. However, in other embodiments, keeping training corpus 112 accessible to AM component 110 may allow training corpus 112 to be updated as new input utterances are recognized, allowing for adaptive re-training of AM component 110 as updates to training corpus 112 occur. The AM may take any suitable form and may be trained using any suitable technique, examples of which (e.g., HMMs) are known.

In some embodiments, AM component 110 may be configured to extract any suitable acoustic features from the input utterance and match the extracted features to one or more hypotheses for a sequence of sound units that are distinctive in a language of the speech being recognized. As discussed above, the AM may be configured to recognize sound units of any suitable length or level, such as phonemes, diphones, triphones, pentaphones, syllables, words, tokens of one or more words each, etc.

In some embodiments, the candidate sound unit sequences (or one or more best-scoring candidates determined to be most likely to match the extracted acoustic features of the input utterance, such as the n-best list of candidates) output by AM component 110 may be processed by SLM component 120 to score the candidate word sequences output by AM component 110 according to their language model probabilities, or to generate and score candidate word sequences corresponding to the sub-word sound unit sequences output by AM component 110. The SLM may take any suitable form and may be trained using any suitable technique, examples of which (e.g., N-gram SLM) are known. In some embodiments, the SLM may be trained using a large training corpus 122 of texts collected from any suitable source. As with training corpus 112, in some embodiments training corpus 122 may be maintained accessible to SLM component 120, and in some embodiments training corpus 122 may be updated with newly recognized texts for adaptive re-training of SLM component 120, although neither of these configurations is required. In some embodiments, training corpus 122 may be constructed to be specific to a particular domain in which ASR system 100 is to be used, and may be formed from texts in that same domain, such as past e-mails for an e-mail application, or past medical reports for a medical dictation system. It should be appreciated that an SLM may be trained on training data from a restricted domain while still being considered to perform ASR in a free-text environment based on the absence of assumptions as to what the user is expected to say as input. For example, an SLM trained on a medical dictation corpus may have learned different probabilities for the same N-grams as an SLM trained on an e-mail corpus, and some N-grams may have very low or zero probabilities because they happened to be encountered rarely or never in the particular training corpus, but in principle the ASR environment may still be considered free-text when any arbitrary speech input is accepted, and when a failure to recognize input word sequences that happened not to be represented in the training data is considered a recognition error rather than a user's out-of-grammar misstatement.

It should be appreciated that the foregoing description of AM component 110 and SLM component 120 is merely exemplary, and any other suitable implementation of an SLM, with or without a separate AM, may alternatively be used. For example, in some embodiments, the AM and the SLM may not be implemented as separate components, but instead may be implemented as a single combined statistical model that jointly evaluates candidate word sequences for language model likelihood and acoustic match to the input speech utterance. In other embodiments, acoustic modeling and language modeling tasks may be combined and/or distributed in any suitable way within ASR system 100.

It should be appreciated from the foregoing that in some embodiments, after applying an SLM (with or without a separate AM) to an input speech utterance, the result may be a set of candidate word sequences for recognition of the input utterance, each of the candidate word sequences having a score assigned to it and output by the SLM. The initial scores may be computed by the SLM using any suitable technique(s). In some embodiments, the initial score may be based on the N-gram probabilities of the words in the candidate word sequence, as learned from the training corpus. In some embodiments, the language model score for a candidate word sequence may be combined in any suitable way with its acoustic model scores evaluating the quality of the match between the candidate word sequence and the acoustic features of the input utterance, to form the initial score output by the SLM. For example, in some embodiments, the initial score output by the SLM for a candidate word sequence may be a weighted sum of scores (e.g., probabilities, or log probabilities, etc.) from the acoustic model and the language model for the candidate word sequence. However, in other embodiments, the acoustic model scores may be kept separate from the language model scores output by the SLM.

In some embodiments, one or more of the candidate word sequences and their initial scores output from SLM component 120 (which could include all of the candidate word sequences or some subset, such as the n-best list of candidates) may then be processed by semantic processing component 130, to revise the SLM scores based on information that can be ascertained regarding the semantic classification of one or more tokens in the input utterance. In some embodiments, semantic processing component 130 may thus analyze at least some of the candidate word sequences received from SLM component 120 to generate one or more hypotheses for the semantic class of one or more tokens in each of the candidate word sequences.

The term "token," as used herein, refers to a unit of one or more words that functions as a single semantic entity (in some cases, as a noun or noun phrase), and for which there is a defined semantic class in the system. In some embodiments, for example, semantic processing component 130 may be programmed with or have access to a list of known semantic classes of tokens that semantic processing component 130 is to detect in input utterances. The following is an exemplary list of semantic classes, any one or more of which may be used in some embodiments without limitation. It should be appreciated, however, that the following are merely some examples, and any suitable semantic classes may be used, including any suitable semantic classes not appearing in the list below.

Telephone number
Time of day
Social security number
Date of birth
Date

Bank account number
Credit card number
Driver's license number
Insurance policy number
Medical account number
Passport number
Zip code
Postal code
ISBN
Freeway number
Flight number
Train number
Airport gate number
Latitude
Longitude
Altitude
Nationality
Citizenship
Address Thus, in some embodiments, the length of a portion of an input utterance that is considered to be a token may depend on what semantic classes are defined and what tokens belong in each semantic class. For example, for the telephone number class, a token may be defined as a digit sequence in the form ddd-dddd or ddd-ddd-dddd, etc. (where each "d" stands for a single digit), regardless of whether the entire digit sequence is considered to be a single word in the utterance or whether each digit is considered to be its own word. For the social security number class, each digit sequence in the form ddd-dd-dddd may be a token, and so on. In some embodiments, semantic processing component 130 may analyze a candidate word sequence for the input utterance to identify any token(s) that could possibly be assigned to one of the known semantic classes defined in the system. This may be done in any suitable way, non-limiting examples of which are described below.

One possible technique that semantic processing component 130 may use in some embodiments to detect tokens that could belong to a particular semantic class may be to examine the structure and/or content of the token itself for characteristics that could place it in that semantic class. For example, a token consisting of a sequence of nine digits could belong in the social security number class. A token ending with the letters "AM" or "PM" could belong in the time of day class. Other examples could be constructed for various other particular semantic classes, and may be included in the programming of semantic processing component 130 as hard-coded rules.

Another possible technique for detecting tokens that could belong to a particular semantic class, which may be combined with or utilized instead of the token-internal analysis described above, may be to search other parts of the utterance for particular keywords defined for the semantic class, and then to identify a token having particular characteristics of the semantic class if the utterance contains one or more of the keywords. For example, the detection of keywords such as the following could result in a hypothesis that a nearby numerical token could belong to the time of day class: "o'clock," "in the morning/afternoon/evening," "at night," "midnight," "noon," "midday," "PST/MST/CST/EST," "yesterday/today/tomorrow," "Monday/ . . . /Sunday," "from . . . to," "between . . . and," "till/until," "up to," etc. In another example, keywords such as "birthday," "b-day," "DOB," and "date of birth" may trigger a hypothesis that a nearby numerical token could belong to the date of birth class. Other examples could be constructed for various other particular semantic classes, and may be included in the programming of semantic processing component 130 as hard-coded rules.

Alternatively or additionally, in some embodiments semantic processing component 130 may utilize one or more statistical semantic class detectors to generate hypotheses as to the semantic class of one or more tokens in the input utterance. Such statistical semantic class detectors may be implemented in any suitable way using any suitable statistical modeling technique(s). For example, in some embodiments, a detector may be trained for each semantic class that semantic processing component 130 is to detect, and each of the detectors may be applied to a candidate word sequence such that any token in the candidate word sequence that should be considered for a particular semantic class will be flagged by the detector for that semantic class. In some embodiments, a statistical semantic class detector may be trained on a corpus of training texts which have been hand-labeled as to which tokens in the training texts belong to which known semantic class(es). This may be the same or a different training corpus from training corpus 122 used to train the SLM, with the addition of semantic class labeling. The detector may be programmed with a set of features to extract from any given word sequence, and may process the training corpus to determine probabilities with which various features and/or feature combinations are associated with labels of the semantic class which the detector is being trained to detect. The detector may then extract the same features from an input candidate word sequence and apply the learned probabilities to detect when the candidate word sequence contains a token that should be considered for that semantic class. Any suitable set of features may be used, examples of which include token-internal features such as length of the token under consideration and number and/or placement of digits, numbers and/or letters in the token, and/or token-external features such as neighboring and/or nearby words, N-grams and/or detected semantic classes, sentence position of the token, etc. Also, any suitable probability threshold may be set for a semantic class detector to fire on a given token. For example, in some embodiments, a semantic class detector may flag any token for which the detector computes a non-zero probability that the token belongs to the semantic class; while in other embodiments, the semantic class detector may only flag tokens for which the detector computes a probability higher than a certain threshold, which may be set to any suitable value. In some embodiments, the threshold may be set experimentally, e.g., by trying various thresholds and observing their effect on the recognition error rate. Different firing thresholds may be set for different semantic class detectors, or the same threshold may be set for multiple detectors.

In some embodiments, once one or more tokens in one or more candidate word sequences for the input utterance have been associated with one or more hypotheses as to the semantic class of the token using any suitable semantic class detection technique, semantic processing component 130 may revise the initial scores from the SLM using the information of the semantic class hypotheses. This may be done in any suitable way, non-limiting examples of which are described below.

One possible technique that semantic processing component 130 may use in some embodiments to revise the SLM score for a candidate word sequence, for which a hypothesis has been generated for a semantic class of a token in the candidate word sequence, is to replace the initial SLM score with a revised score that accounts for the occurrence probability of the hypothesized semantic class, and/or for the occurrence probability of the particular token conditioned on occurrence of the hypothesized semantic class. In some embodiments, however, the SLM score may not be completely replaced with such a revised score, but may be weighted by and/or otherwise combined with a new score generated using techniques such as those described below.

For instance, in one example, a revised score for the probability of a candidate word sequence $W_1,t,W_2$, where $W_1$ denotes the sequence of words preceding the token in the candidate word sequence, t denotes the token for which a semantic class hypothesis has been generated, and $W_2$ denotes the sequence of words following the token in the candidate word sequence, may be computed as follows:

$$Pr(W_1,t,W_2)=Pr(t|W_1,C,W_2)*Pr(W_1,C,W_2)$$

where C denotes the hypothesized semantic class for token t, $Pr(t|W_1,C,W_2)$ denotes the probability of a token belonging to semantic class C being token t when preceded by word sequence $W_1$ and followed by word sequence $W_2$, and $Pr(W_1,C,W_2)$ denotes the probability of a token belonging to semantic class C occurring after word sequence $W_1$ and before word sequence $W_2$. One exemplary way of approximating the term $Pr(W_1,C,W_2)$ may be as follows:

$$Pr(W_1,C,W_2) \approx Pr(W_2|W_1,C)*Pr(C|W_1)*Pr(W_1)$$

where $Pr(W_2|W_1,C)$ denotes the probability of word sequence $W_2$ occurring next given that word sequence $W_1$ and a token of semantic class C have occurred, $Pr(C|W_1)$ denotes the probability of a token of semantic class C occurring next after word sequence $W_1$ has occurred, and $Pr(W_1)$ denotes the occurrence probability of word sequence $W_1$. Each of these terms, in turn, may be computed in any suitable way. In some embodiments, they may be computed from N-gram probabilities using a training corpus with tokens of semantic class C labeled.

One exemplary way of approximating the term $Pr(t|W_1,C,W_2)$ may be as follows:

$$Pr(t|W_1,C,W_2) \approx Pr(t|C)*Pr(C|W_1,T,W_2)$$

where $Pr(t|C)$ denotes the probability of token t given (conditioned on) the occurrence of semantic class C, and $Pr(C|W_1,T,W_2)$ denotes the probability of any token T belonging to semantic class C when preceded by word sequence $W_1$ and followed by word sequence $W_2$. As discussed above, one way $Pr(C|W_1,T,W_2)$ may be computed is from the output of a statistical semantic class detector for semantic class C; however, this is merely one example, and any suitable technique may be used to compute the occurrence probability of semantic class C, other examples of which are described above.

Likewise, $Pr(t|C)$, the occurrence probability of the particular token t conditioned on occurrence of the hypothesized semantic class C, may be computed in any suitable way. In one example, semantic processing component 130 may be connected to or otherwise have access to a tokens dataset 134 containing a list of valid tokens for each of one or more semantic classes. In some embodiments, any token t, that appears in tokens dataset 134 for semantic class C may be assigned a suitable non-zero probability for $Pr(t_i|C)$, while any token that does not appear in tokens dataset 134 for semantic class C may be assigned a zero probability or a very low probability. For tokens that appear in tokens dataset 134, probabilities may be assigned in any suitable way; one example is to assign each token a probability of 1 divided by the total number of tokens for semantic class C.

For instance, consider the example of a sequence of one or more address tokens, often spoken as: # street-name, city-name, state-name [zip-code]. In some embodiments, tokens dataset 134 may contain lists of valid address token combinations, and processing such as the following may be carried out:

City, state: Each state has a limited set of cities that exist in the state. The probability Pr(city|state) can be calculated. When the city token recognized in the candidate word sequence does not exist in the dataset for the recognized state token, a penalty may be given to the probability for the city-state pair.

Street, city [state]: Similarly, consider Pr(street|city, state). If the street does not exist in the city, a penalty may be given to the recognized address candidate.

Street address (#, street, city, state): Similarly, consider Pr(#|street, city, state). If the number is not in the valid range, or is missing from a database of legal addresses, a penalty may be given to the recognized address candidate.

In another example, semantic processing component 130 may be connected to or otherwise have access to a rules dataset 132 that contains, for each of one or more semantic classes, a set of rules to which tokens in that semantic class are expected to adhere. For instance, an exemplary set of rules could specify that a token in the time of day class should be in one of the following formats:

hh, where hh is a number between 0 and 24 hh [AM/PM], where hh is a number between 1 and 12 hh:mm, where hh is a number between 0 and 24, and mm is a number between 00 and 59 hh:mm [AM/PM], where hh is a number between 1 and 12, and mm is a number between 00 and 59 mm to/past hh, where hh is a number between 1 and 12, and mm is a number between 1 and 30, "a quarter," or "half"

In some embodiments, when a particular semantic class is hypothesized for a token in a candidate word sequence and the token does not comply with the set of rules for that semantic class, a zero or very low probability may be assigned to that token. Thus, the set of rules may restrict which tokens are valid for a particular semantic class. In some embodiments, any token $t_i$ that does comply with the set of rules for that semantic class may be assigned a suitable non-zero probability for $P(t_i|C)$. Such probabilities may be assigned in any suitable way. In one example, any token that complies with the set of rules for its semantic class may be assigned $P(t_i|C)=1$, indicating that the token complies with the rules and can automatically be accepted as a member of semantic class C. In another example, once a token has been determined to comply with the set of rules for its semantic class, its probability within that semantic class may be assigned using statistical training techniques, examples of which are described below. In yet another example, probabilities $P(t_i|C)$ may be defined manually in any suitable way. For instance, an expert could define $P(t_i|C)$ for a blood pressure semantic class as zero for tokens that are negative numbers or 0, a small probability for tokens between 30 and 60, a larger probability for tokens between 60 and 200, a small probability again for tokens between 200 and 500, and zero for tokens above 500.

For further illustration, some other non-limiting examples of rules that could be applied to tokens in particular semantic classes are provided below.

Exemplary Rule for a Date of Birth Class

For a user applying for a driver's license, the year value should be in the range [Current year minus 95, Current year minus 16]

For a user applying for a passport, the year value should be in the range [Current year minus 120, Current year]

Exemplary Rules for a Telephone Number Class in Canada and the U.S.
Only digit strings of length value 7, 10, or 11 can be valid telephone numbers, and they should be in the following patterns:
7 digits (without area code: NXX-XXXX)
10 digits (with area code: [NXX] NXX-XXXX)
11 digits (10 digits plus the country code 1 as the first digit: [1] [NXX] NXX-XXXX)
N may be any digit in the range [2-9], and X may be any digit in the range [0-9]
Only a limited number of area codes are valid; the U.S. and Canada only use 393 area codes. These may be maintained in a look-up table for the rule.

Exemplary Rules for a Date Class
Year value restrictions:
YYYY—Four-digit year, e.g., 1996
YY—Two-digit year, e.g., '96
Month value restrictions:
MM—Two-digit month, e.g., 04, range [01-12]
M—One-digit month for months below 10, e.g., 4, range [1-9]
MMM—Three-letter abbreviation for month, e.g., Sep for September, range [Jan to Dec]
MMMM—Month spelled out in full, e.g., October, range [January to December]
Day value restrictions:
DD—Two-digit day, e.g., 02, range [01-31]
D—one-digit day for days below 10, e.g., 2, range [1-9]
Restrictions on combinations:
If the month's numerical value is in [4, 6, 9, 11], the day value's range DD is [01-30]
If the month's numerical value is in [1, 3, 5, 7, 8, 10, 12], the day value's range DD is [01-31]
If the month's numerical value is 2 (i.e., MM=02 or MM=2 or MMM=Feb or MMMM=February):
If the year value is divisible by 400, then DD value range is [01-29]
Else if the year value is divisible by 100, then DD value range is [01-28]
Else if the year value is divisible by 4, then DD value range is [01-29]
Else DD value range is [01-28]

Exemplary Rules for a Social Security Number Class
In the U.S., a social security number (SSN) consists of nine digits, commonly written as three fields separated by hyphens: AAA-GG-SSSS. The first three-digit field is called the "Area Number." The central two-digit field is called the "Group Number." The final four-digit field is called the "Serial Number."
Area Numbers are assigned to geographic locations. Invalid Area Numbers are 000, 666, 900-999.
Group Numbers for each Area Number are assigned in the following order:
Odd numbers, 01 to 09
Even numbers, 10 to 98
Even numbers, 02 to 08
Odd numbers, 11 to 99
Group Number 00 is not assigned.
SSA publishes a list every month of the highest group assigned for each SSN Area. If the highest group assigned for Area 999 is 72, for example, then 999-04-1234 is an invalid SSN because even Groups under 9 have not yet been assigned.
Serial Numbers are in the range [0001-9999]

In yet another example, in some embodiments semantic processing component 130 may compute Pr(t|C) empirically based on hand-labeled training data, e.g., by observing the proportion of tokens of semantic class C that are the specific token t in a training corpus of texts. In some embodiments, as discussed above, statistical training may be combined with hard-coded rules, such that, for example, the rules may eliminate invalid candidates, and then surviving candidates may be scored statistically.

In some embodiments, once one or more of the candidate word sequences for the input utterance have been re-scored based on hypotheses for semantic classes of tokens in the candidate word sequences, the list of candidate word sequences may be re-ordered to form a list ranked based on the revised scores. In some embodiments, the ranked list based on the revised scores (or, e.g., the n-best candidates from the ranked list) may be output by semantic processing component 130 to any suitable destination. For example, in some embodiments, the list of candidates and revised scores may be received for further processing by a system making use of output from ASR system 100. In some embodiments, the candidates may be output as text 140 to, e.g., a user interface 150 for review by user 10 or another user. In other embodiments, however, a single best candidate word sequence may be selected from the list based on the revised scores, and may be output as text 140 as the recognition results (i.e., the recognized word sequence) for the input utterance, or output to a different destination for further processing.

Figure 2:
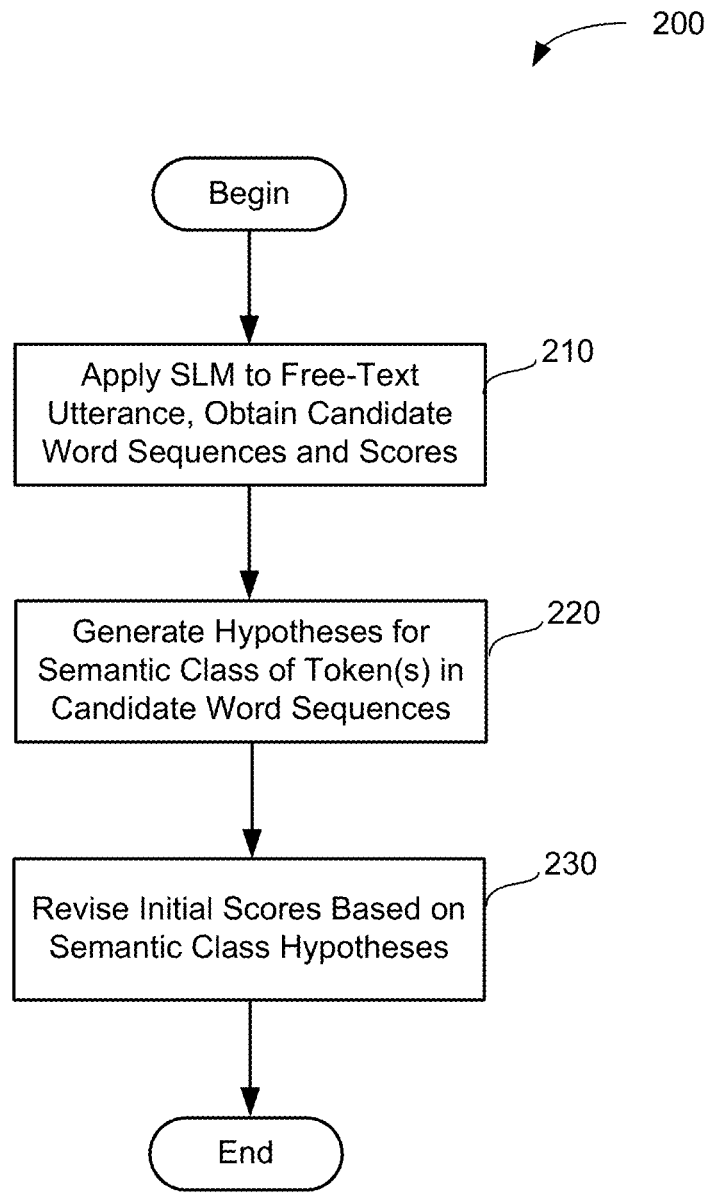
FIG. 2 is a flowchart illustrating an exemplary method of revising language model scores in accordance with some embodiments.

It should be appreciated from the foregoing that one embodiment is directed to a method 200 for revising language model scores, as illustrated in FIG. 2. Method 200 may be performed, for example, by one or more components of an ASR system such as exemplary system 100 illustrated in FIG. 1, although other implementations are possible and method 200 is not limited in this respect. Method 200 begins at act 210, at which an SLM may be applied to a free-text input utterance, and a set of candidate word sequences for ASR of the input utterance, along with a corresponding initial score output by the SLM for each of the candidate word sequences, may be obtained. At act 220, one or more of the candidate word sequences may be analyzed to generate one or more hypotheses for a semantic class of at least one token in the respective candidate word sequence. Method 200 ends at act 230, at which the initial scores for at least the one or more candidate word sequences that were analyzed may be revised based at least in part on the one or more hypotheses for the semantic class of the token(s) in each of the one or more candidate word sequences. Some exemplary techniques for revising SLM scores are described above, and further exemplary techniques are described below.

In some embodiments, it may be possible for multiple different hypotheses to be generated for the semantic class of a particular token in a particular candidate word sequence. In such cases, the multiple hypotheses may be scored and processed in any suitable way to create any suitable ASR output, examples of which are described below. Consider, for instance, the input utterance, "Show me where to catch the three eighteen bus," which could be spoken, for example, as a query to a virtual agent. Assume, for purposes of this example, that the candidate word sequences output from the SLM for this input utterance are, "Show me where to catch the three eighteen bus," and, "Show me where to catch the three eighty bus." In this case, semantic processing component 130 may generate more than one hypothesis for the semantic class of the token "three eighteen" in the first candidate word sequence and "three eighty" in the second candidate word sequence. For example, in each candidate word sequence, the respective token may trigger a positive detection in a time of day class detector, a date class detector, and a bus number class detector (among other potential hypotheses). Thus, there are a total of at least six hypotheses for two candidate word sequences:

| Candidate Word Sequence | Recognized Token | Semantic Class Hypothesis |
|---|---|---|
| 1 | three eighteen | [Time] 3:18 |
| 1 | three eighteen | [Date] 3/18 |
| 1 | three eighteen | [Bus number] 318 |
| 2 | three eighty | [Time] 3:80 |
| 2 | three eighty | [Date] 3/80 |
| 2 | three eighty | [Bus number] 380 |

In some embodiments, semantic processing component 130 may compute a separate score for each different semantic class hypothesis for each candidate word sequence:

| Candidate Word Sequence | Recognized Token | Semantic Class Hypothesis | Score |
|---|---|---|---|
| 1 | three eighteen | [Time] 3:18 | $P_{11}$ |
| 1 | three eighteen | [Date] 3/18 | $P_{12}$ |
| 1 | three eighteen | [Bus number] 318 | $P_{13}$ |
| 2 | three eighty | [Time] 3:80 | $P_{21}$ |
| 2 | three eighty | [Date] 3/80 | $P_{22}$ |
| 2 | three eighty | [Bus number] 380 | $P_{23}$ |

In some embodiments, all of these individual separate scores may be ranked, and the best recognition result for the input utterance may be considered to be the single highest-ranked hypothesis. In this example, assume the hypothesis scores are ranked as follows:

| Candidate Word Sequence | Recognized Token | Semantic Class Hypothesis | Score | Rank |
|---|---|---|---|---|
| 1 | three eighteen | [Time] 3:18 | $P_{11}$ | 1 |
| 1 | three eighteen | [Date] 3/18 | $P_{12}$ | 3 |
| 1 | three eighteen | [Bus number] 318 | $P_{13}$ | 4 |
| 2 | three eighty | [Time] 3:80 | $P_{21}$ | 6 |
| 2 | three eighty | [Date] 3/80 | $P_{22}$ | 5 |
| 2 | three eighty | [Bus number] 380 | $P_{23}$ | 2 |

In this example, score $P_{11}$, for candidate word sequence 1 with the token "three eighteen" assigned to the [Time] class, is the highest of the six scores. Score $P_{23}$, for candidate word sequence 2 with the token "three eighty" assigned to the [Bus number] class, ranks second; and score $P_{12}$, for candidate word sequence 1 with the token "three eighteen" assigned to the [Date] class (for March 18), ranks third. Scores $P_{13}$, $P_{22}$ and $P_{21}$ rank less highly, because, for instance, there is not a bus numbered 318 in the vicinity of the user, 3/80 for March 80 is an invalid date and 3/80 for March 1980 is unlikely to be correct because it is in the past, and 3:80 is an invalid time.

In some embodiments, the highest ranked of these individual hypotheses may simply be selected and output as the recognized word sequence for the input utterance. In this case, since $P_{11}$ is the highest ranking score, the output text would be, "Show me where to catch the 3:18 bus," where the selection of candidate word sequence 1 determines that "three eighteen" is chosen over "three eighty," and the selection of the [Time] class hypothesis determines that the token is formatted as "3:18" as opposed to "3/18" or "318." In addition, the selection of the [Time] class hypothesis may be output with the recognition result for subsequent processing, so that the token is interpreted as a time when processing the user's query.

Figure 3A:
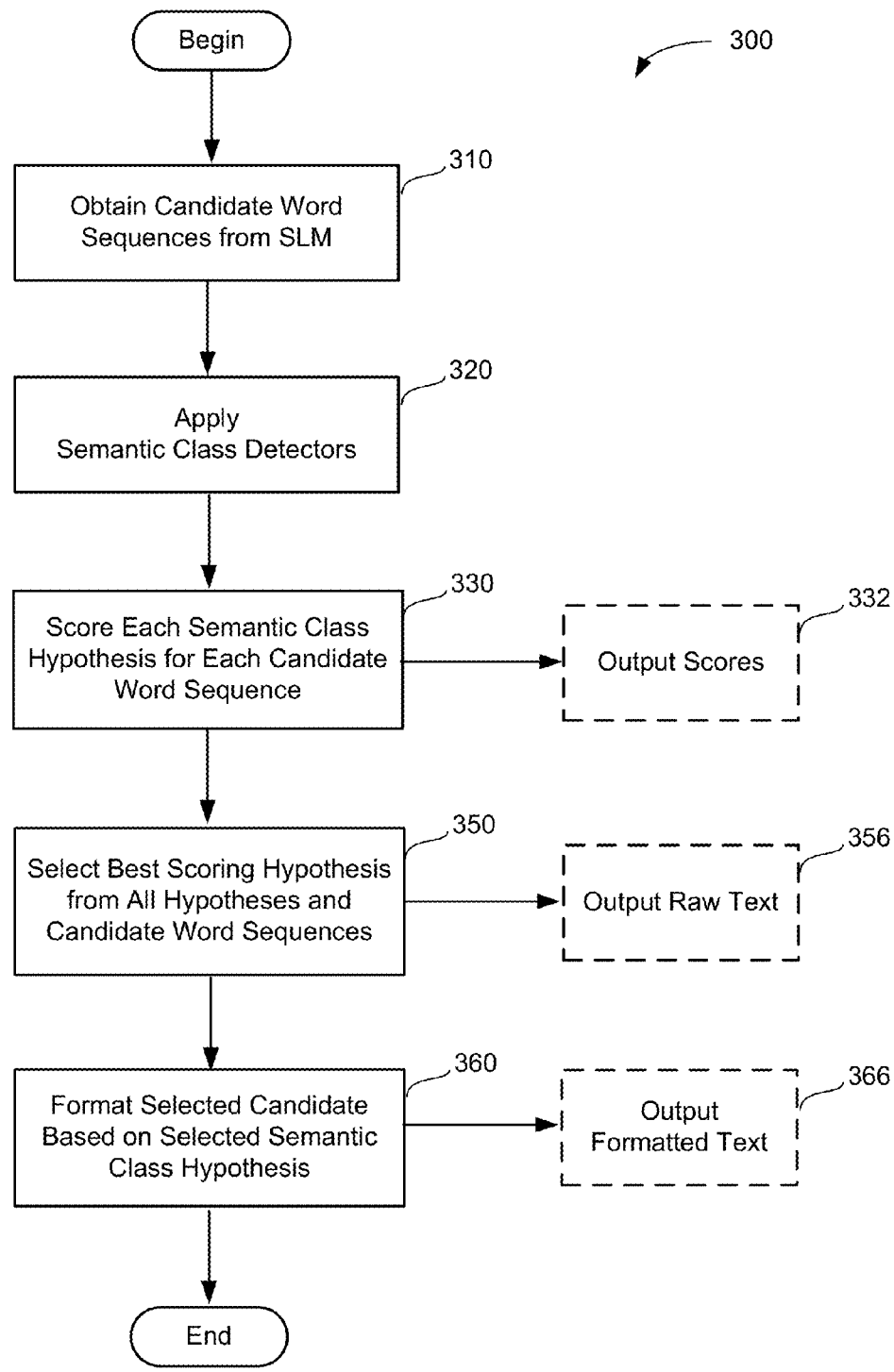
FIGS. 3A, 3B and 3C are flowcharts illustrating exemplary methods of recognizing speech in accordance with some embodiments.

This type of embodiment for handling multiple semantic class hypotheses per candidate word sequence is illustrated in FIG. 3A with exemplary method 300. Method 300 begins at act 310, at which a set of candidate word sequences for ASR of the input utterance may be obtained from an SLM. At act 320, a set of semantic class detectors may be applied to the set of candidate word sequences, and one or more of the candidate word sequences may have one or more semantic class hypotheses generated for one or more tokens in the respective candidate word sequence by the corresponding semantic class detector(s). Some candidate word sequences may have no tokens that trigger any detections from any of the semantic class detectors; some candidate word sequences may have one or more tokens that trigger only one semantic class hypothesis; and some candidate word sequences may have one or more tokens that trigger multiple semantic class hypotheses.

At act 330, each semantic class hypothesis for each candidate word sequence may be individually scored. In the example given above, this would result in an individual score for each of the following:

| Word Sequence Hypothesis: | Score: |
|---|---|
| Show me where to catch the [Time] 3:18 bus. | $P_{11}$ |
| Show me where to catch the [Date] 3/18 bus. | $P_{12}$ |
| Show me where to catch the [Bus number] 318 bus. | $P_{13}$ |
| Show me where to catch the [Time] 3:80 bus. | $P_{21}$ |
| Show me where to catch the [Date] 3/80 bus. | $P_{22}$ |
| Show me where to catch the [Bus number] 380 bus. | $P_{23}$ |

At act 332, optionally, the computed scores may be output to any suitable destination for review and/or further processing. At act 350, the best-scoring hypothesis may be selected from all of the hypotheses from all of the candidate word sequences. In the example given above, this would be score $P_{11}$ for the [Time] hypothesis for candidate word sequence 1. At act 356, the raw text for the candidate word sequence corresponding to the selected hypothesis may optionally be output to any suitable destination for review and/or further processing. In the example given above, this would be, "Show me where to catch the three eighteen bus." At act 360, the selected candidate word sequence may be formatted according to the selected semantic class hypothesis, and at act 366 the formatted text may optionally be output to any suitable destination for review and/or further processing. In the example given above, the formatted text would be, "Show me where to catch the 3:18 bus," with the token "three eighteen" formatted as "3:18" in accordance with the [Time] class.

In other embodiments, semantic processing component 130 may combine the individual scores of all of the semantic class hypotheses for each candidate word sequence to determine which candidate word sequence is most likely correct across the semantic class hypotheses. In the example given above, the individual scores could be combined as follows:

| Candidate Word Sequence | Recognized Token | Semantic Class Hypothesis | Individual Score - Rank | Combined Score | Rank |
|---|---|---|---|---|---|
| 1 | three | [Time] 3:18 | $P_{11}$ - 1 | $P_{11}$ + | 1 |

-continued

| Candidate Word Sequence | Recognized Token | Semantic Class Hypothesis | Individual Score - Rank | Combined Score | Rank |
|---|---|---|---|---|---|
| 1 | eighteen three eighteen | [Date] 3/18 | $P_{12}$ - 3 | $P_{12}$ + $P_{13}$ | |
| 1 | three eighteen | [Bus number] 318 | $P_{13}$ - 4 | | |
| 2 | three eighty | [Time] 3:80 | $P_{21}$ - 6 | $P_{21}$ + $P_{22}$ + $P_{23}$ | 2 |
| 2 | three eighty | [Date] 3/80 | $P_{22}$ - 5 | | |
| 2 | three eighty | [Bus number] 380 | $P_{23}$ - 2 | | |

In this example, when the individual semantic class hypothesis scores for each candidate word sequence are combined, the combined score for candidate word sequence 1 ranks higher than the combined score for candidate word sequence 2. "Show me where to catch the three eighteen bus" may then be selected as the recognized word sequence for the input utterance. If desired, the highest ranking semantic class hypothesis for the selected candidate word sequence may then be selected for inclusion in the recognition results and/or for use in formatting the recognized word sequence. In this example, $P_{11}$ outranks $P_{12}$ and $P_{13}$, and therefore the [Time] semantic class may be selected and used to format the token "three eighteen" as "3:18."

Figure 3B:
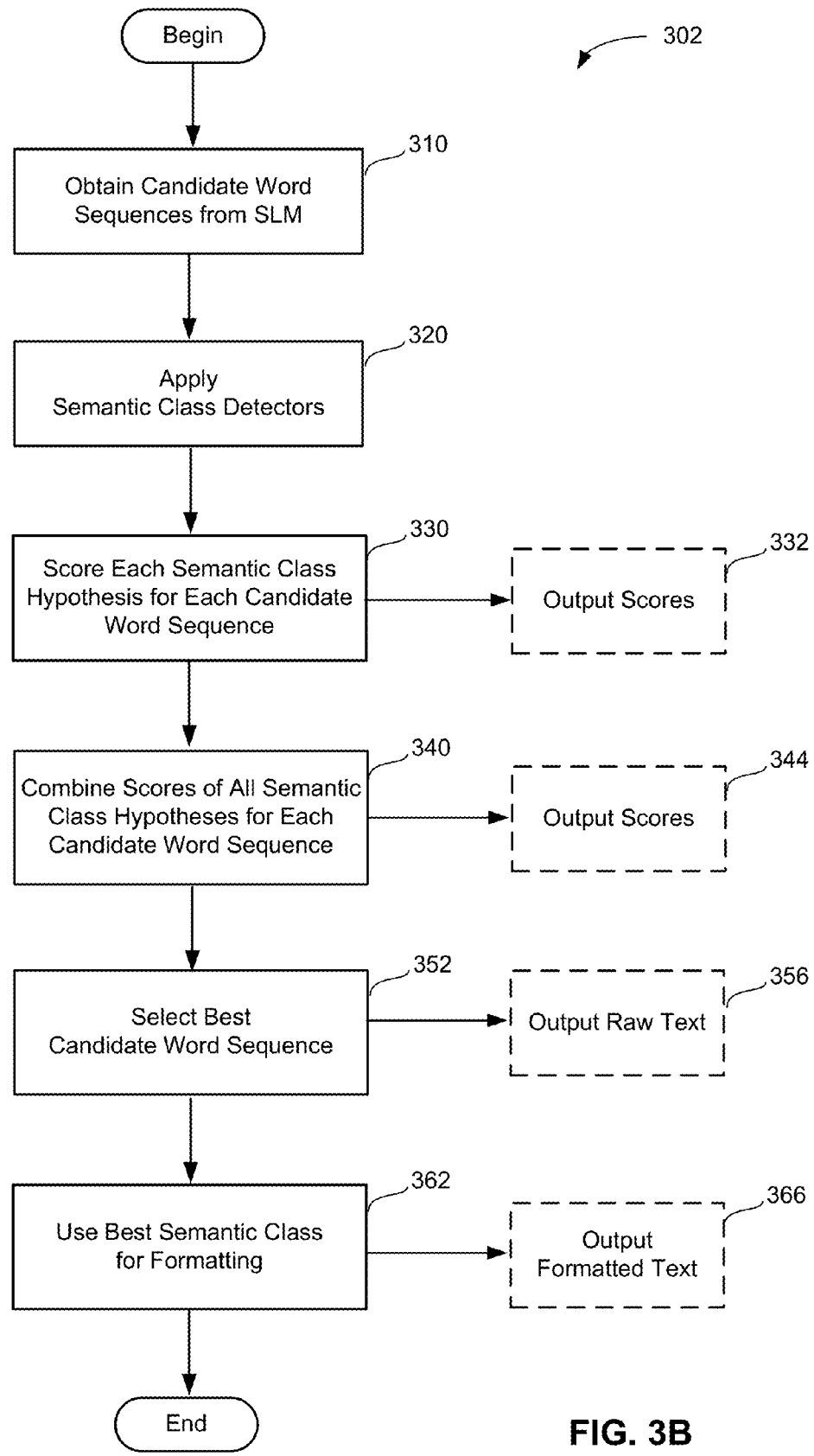

This type of embodiment for handling multiple semantic class hypotheses per candidate word sequence is illustrated in FIG. 3B with exemplary method 302. In method 302, acts 310, 320, 330 and 332 are the same as in method 300. At act 340, after each semantic class hypothesis for each candidate word sequence has been individually scored, the scores for all semantic class hypotheses may be combined for each candidate word sequence. At act 344, optionally, these combined scores may be output to any suitable destination for review and/or further processing. At act 352, the best-scoring candidate word sequence may be selected based on the combined scores for the candidate word sequences, and at act 356 the raw text corresponding to the selected candidate word sequence may optionally be output to any suitable destination for review and/or further processing. In the example given above, this would be, "Show me where to catch the three eighteen bus." At act 362, the best-scoring semantic class for the selected candidate word sequence may be used for formatting the text, and the formatted text may optionally be output at act 366 to any suitable destination for review and/or further processing. In the example given above, the formatted text would be, "Show me where to catch the 3:18 bus," with the token "three eighteen" formatted as "3:18" in accordance with the [Time] class.

A particular specific example applicable to semantic classes in which tokens are digit sequences is described below. In this example, the initial SLM score for a candidate word sequence $W_1,d,W_2$, where d is a particular digit sequence, may be replaced by and/or combined with the following score:

$$Pr(W_1,d,W_2) = Pr(d|W_1,D,W_2)*Pr(W_1,D,W_2)$$

where $Pr(d|W_1,D,W_2)$ denotes the probability that any arbitrary digit sequence D following word sequence $W_1$ and preceding word sequence $W_2$ will be the particular digit sequence d, and $Pr(W_1,D,W_2)$ denotes the probability that any arbitrary digit sequence D will occur following word sequence $W_1$ and preceding word sequence $W_2$. These terms may be calculated in any suitable way. In one example, $Pr(W_1,D,W_2)$ may be approximated as:

$$Pr(W_1,D,W_2) \cong Pr(W_2|W_1,D)*Pr(D|W_1)*Pr(W_1)$$

where $Pr(W_2|W_1,D)$ denotes the probability of word sequence $W_2$ occurring next given that word sequence $W_1$ and any arbitrary digit sequence D have occurred, $Pr(D|W_1)$ denotes the probability of any arbitrary digit sequence D occurring next after word sequence $W_1$ has occurred, and $Pr(W_1)$ denotes the occurrence probability of word sequence $W_1$. Each of these terms, in turn, may be computed in any suitable way. In some embodiments, they may be computed from N-gram probabilities using a training corpus with digit sequences D labeled.

One exemplary way of approximating $Pr(d|W_1,D,W_2)$ may be by summing over all defined semantic classes $C_i(i=1,\ldots,N)$ of digit strings D. In some embodiments, a general class $C_{N+1}$ may also be included for digit strings that do not belong to any of the N defined semantic classes. Then:

$$Pr(d|W_1,D,W_2) \cong \sum_{i=1}^{N+1} Pr(d|C_i)*Pr(C_i|W_1,D,W_2)$$

where $Pr(d|C_i)$ denotes the probability of digit sequence d given (conditioned on) the occurrence of semantic class $C_i$, and $Pr(C_i|W_1,D,W_2)$ denotes the probability of any arbitrary digit sequence D belonging to semantic class $C_i$ when preceded by word sequence $W_1$ and followed by word sequence $W_2$. As discussed above, one way $Pr(C_i|W_1,D,W_2)$ may be computed is from the output of a statistical semantic class detector for semantic class $C_i$; however, this is merely one example, and any suitable technique may be used to compute the occurrence probability of semantic class $C_i$, other examples of which are described above.

In other embodiments, semantic processing component 130 may combine the individual scores of all of the candidate word sequences for each semantic class hypothesis, to determine which semantic class hypothesis is most likely correct before selecting the recognized word sequence. In the example given above, the individual scores could be combined as follows:

| Candidate Word Sequence | Recognized Token | Semantic Class Hypothesis | Individual Score - Rank | Combined Score | Rank |
|---|---|---|---|---|---|
| 1 | three eighteen | [Time] 3:18 | $P_{11}$ - 1 | $P_{11}$ + $P_{21}$ | 1 |
| 2 | three eighty | [Time] 3:80 | $P_{21}$ - 6 | | |
| 1 | three eighteen | [Date] 3/18 | $P_{12}$ - 3 | $P_{12}$ + $P_{22}$ | 3 |
| 2 | three eighty | [Date] 3/80 | $P_{22}$ - 5 | | |
| 1 | three eighteen | [Bus number] 318 | $P_{13}$ - 4 | $P_{13}$ + $P_{23}$ | 2 |
| 2 | three eighty | [Bus number] 380 | $P_{23}$ - 2 | | |

In this example, when the individual candidate word sequence scores for each semantic class hypothesis are combined, the [Time] hypothesis ranks highest, and thus may be selected as the best semantic class for the token alternatively recognized as "three eighteen" and "three eighty." The highest ranking candidate word sequence for the selected semantic class may then be selected as the recognized word sequence. In this case, $P_{11}$ outranks $P_{21}$, and therefore "Show me where to catch the three eighteen bus" may be selected as the recognized word sequence for the input utterance. If desired, the selected semantic class hypothesis may then be included in the recognition results and/or used in formatting the recognized word sequence as, "Show me where to catch the 3:18 bus."

Figure 3C:
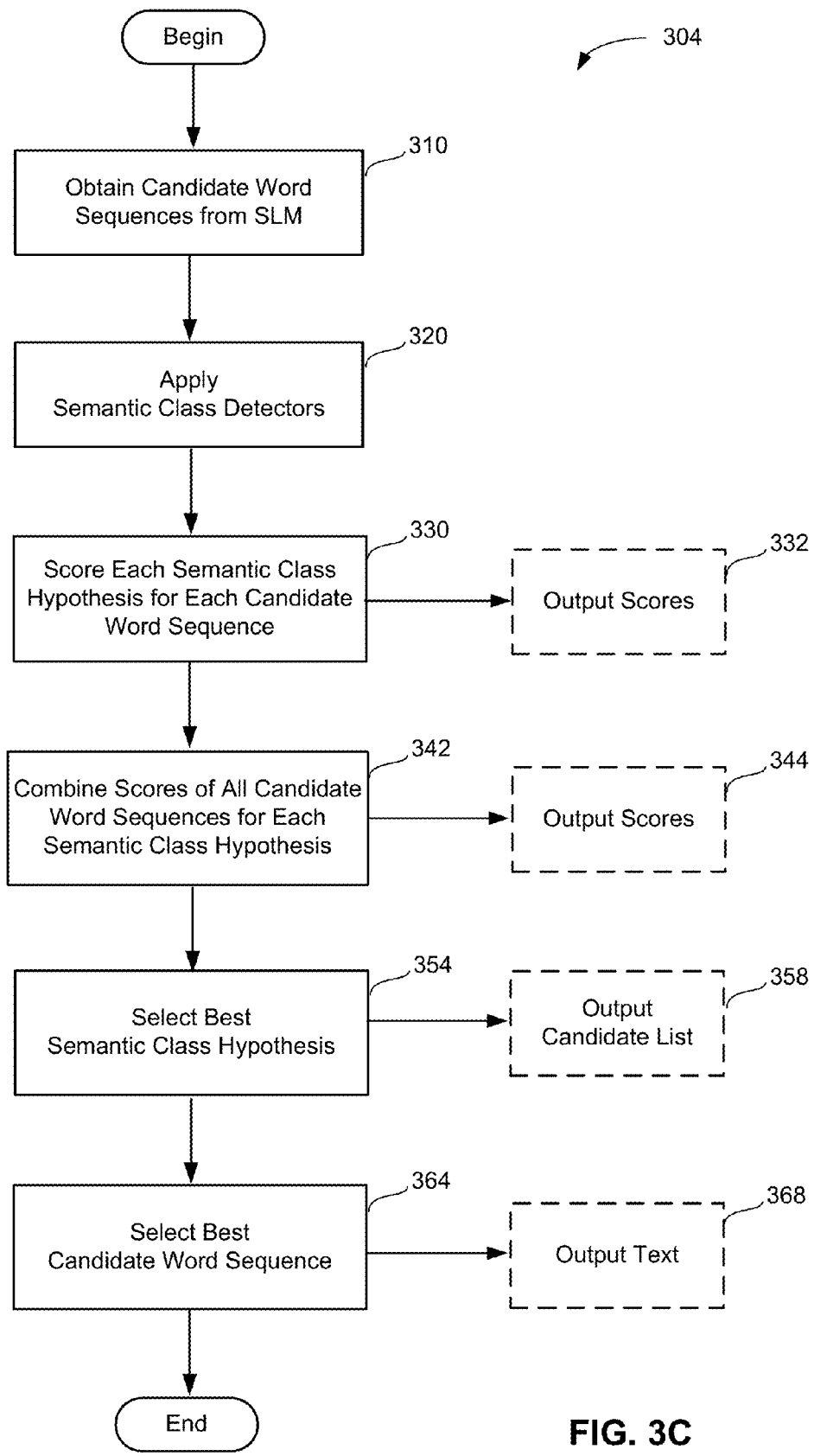

This type of embodiment for handling multiple semantic class hypotheses per candidate word sequence is illustrated in FIG. 3C with exemplary method 304. In method 304, acts 310, 320, 330 and 332 are the same as in methods 300 and 302. At act 342, after each semantic class hypothesis for each candidate word sequence has been individually scored, the scores for all candidate word sequences may be combined for each semantic class hypothesis. At act 344, optionally, these combined scores may be output to any suitable destination for review and/or further processing. At act 354, the best-scoring semantic class hypothesis may be selected based on the combined scores for the semantic class hypotheses, and at act 358 the selected semantic class hypothesis and/or the list of candidate word sequences corresponding to the selected semantic class hypothesis may optionally be output to any suitable destination for review and/or further processing. At act 364, the best-scoring candidate word sequence for the selected semantic class hypothesis may be selected as the recognized word sequence for the input utterance, and the raw and/or formatted text may optionally be output at act 368 to any suitable destination for review and/or further processing. In the example given above, the raw text would be, "Show me where to catch the three eighteen bus," and the formatted text would be, "Show me where to catch the 3:18 bus," with the token "three eighteen" formatted as "3:18" in accordance with the [Time] class.

In this example, it has been assumed that the scores were such that the same recognized word sequence resulted regardless of which technique was used for processing the scores; however, this may not always be the case. For instance, in the example above, the individual scores could have been such that the combined score for the [Bus number] class ranked higher than the combined score for the [Time] class, since the [Time] class had a lower score than the [Bus number] class for candidate word sequence 2. In this example, the recognized word sequence would be different depending on which technique was used. If the best word sequence were selected based on summing scores across semantic classes, then the recognition output would be "Show me where to catch the [Time] 3:18 bus;" whereas if the best semantic class were selected based on summing scores across words and the candidates for the best word sequence were narrowed to those in the best semantic class, then the recognition output would be "Show me where to catch the [Bus number] 380 bus."

In some embodiments, in addition to revising the scores of candidate word sequences obtained from the SLM, semantic processing component 130 may also generate one or more new candidate word sequences where appropriate based on the semantic class hypotheses generated for candidate word sequences obtained from the SLM. For example, when a semantic class is hypothesized for a token in a candidate word sequence that violates a rule for that semantic class or is otherwise likely to be a misrecognition (e.g., because it has a very low probability for that semantic class), then a new candidate with a more likely token that could correct the misrecognition may be injected into the list of candidate word sequences and scored along with the revised scores for the original candidate word sequences. For instance, in some embodiments, when candidate word sequences include one or more tokens such as "thirty," "forty," "fifty," "sixty," "seventy," "eighty," "ninety," alternative candidates including tokens such as "thirteen," "fourteen," "fifteen," "sixteen," "seventeen," "eighteen," "nineteen," respectively, may also be proposed.

The inventors have appreciated that techniques described herein may be beneficially applied to improve the accuracy of automatic speech recognition where errors might otherwise result due to recognition of tokens that are invalid or improbable when considered in view of their semantic classes. Some techniques described herein may penalize or otherwise discourage invalid or improbable recognition results while biasing recognition toward results that are more probable given the semantic information that can be detected. In some embodiments, when a likely misrecognition is detected, or when the SLM scores indicate that the user may truly have said an invalid token for a given semantic class, an alert may be generated to flag the situation for the user.

Figure 4:
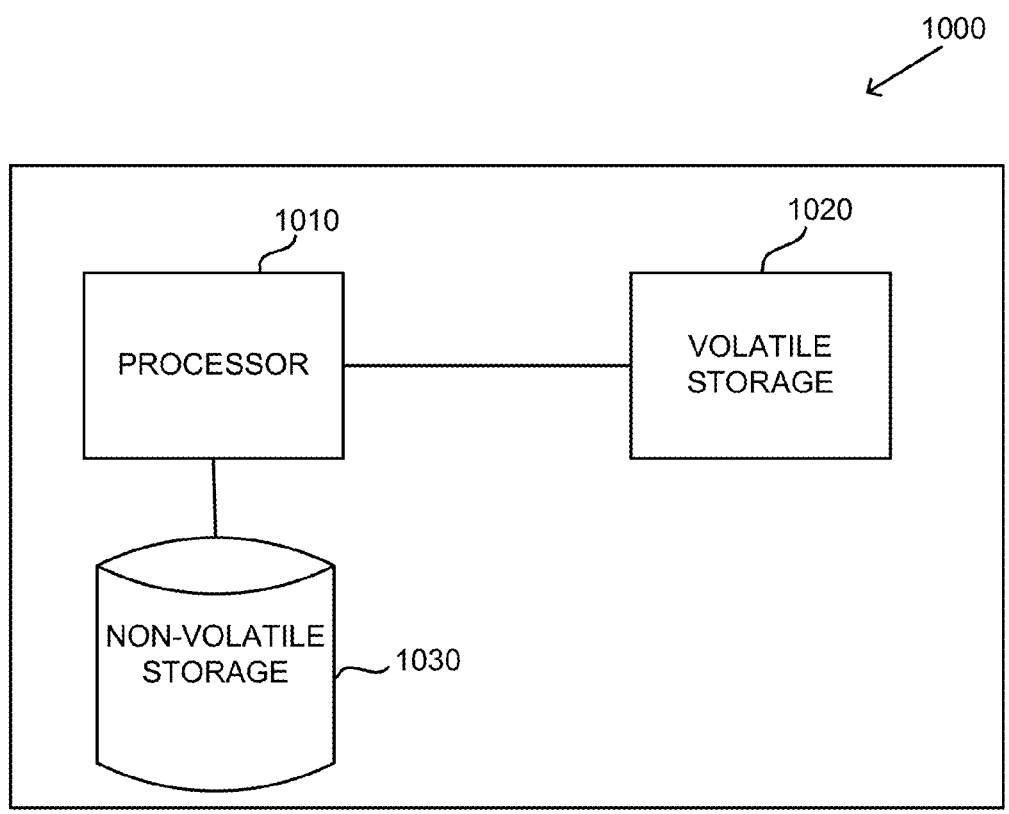
FIG. 4 is a block diagram of an exemplary computer system on which aspects of the present invention may be implemented.

A speech recognition system in accordance with the techniques described herein may take any suitable form, as embodiments are not limited in this respect. An illustrative implementation of a computer system 1000 that may be used in connection with some embodiments of the present invention is shown in FIG. 4. One or more computer systems such as computer system 1000 may be used to implement any of the functionality described above. The computer system 1000 may include one or more processors 1010 and one or more tangible, non-transitory computer-readable storage media (e.g., volatile storage 1020 and one or more non-volatile storage media 1030, which may be formed of any suitable non-volatile data storage media). The processor 1010 may control writing data to and reading data from the volatile storage 1020 and the non-volatile storage device 1030 in any suitable manner, as the aspects of the present invention are not limited in this respect. To perform any of the functionality described herein, the processor 1010 may execute one or more instructions stored in one or more computer-readable storage media (e.g., volatile storage 1020), which may serve as tangible, non-transitory computer-readable storage media storing instructions for execution by the processor 1010.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one computer-readable storage medium (i.e., a tangible, non-transitory computer-readable medium, such as a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement functionality discussed herein. In addition, it should be appreciated that the reference to a computer program which, when executed, performs any of the above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements from each other.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising:
   receiving a free-text input utterance to be recognized;
   applying a statistical language model to the free-text input utterance to obtain a plurality of candidate word sequences for automatic speech recognition of the input utterance, each of the plurality of candidate word sequences having a corresponding initial score generated by the statistical language model;
   for one or more of the plurality of candidate word sequences,
      detecting words corresponding to a sequence of digits, and
      analyzing the detected words corresponding to the sequence of digits, using at least one processor, to generate one or more hypotheses that the words corresponding to the sequence of digits belong to one or more semantic classes, and to determine a separate score for each of the one or more hypotheses indicating a probability that the words corresponding to the sequence of digits belong to the semantic class;
   revising the initial scores for each of the one or more of the plurality of candidate word sequences, wherein revising the initial score for each of the one or more of the plurality of candidate word sequences comprises computing a revised score for the respective candidate word sequence based, at least in part, on the separate scores determined for the one or more hypotheses generated for each of the one or more semantic classes;
   selecting, from among the plurality of candidate word sequences, a best-scoring candidate word sequence using the revised scores; and
   outputting the best-scoring candidate word sequence as an output recognized word sequence for the input utterance.

2. The method of claim 1, wherein the one or more semantic classes are selected from the group consisting of: a year class, a date class, a date of birth class, a social security number class, a blood pressure class, a telephone number class, a postal code class, a street address class, a time of day class, a driver's license number class, a license plate class, a passport number class, an account number class, a card number class, a policy number class, an ISBN class, a road number class, a flight number class, a train number class, an airport gate number class, a latitude class, a longitude class, and an altitude class.

3. The method of claim 1, wherein revising the initial score for a first candidate word sequence of the plurality of candidate word sequences comprises accounting for a probability of occurrence of the detected words corresponding to the sequence of digits in the first candidate word sequence conditioned on occurrence of a semantic class hypothesized for the detected words corresponding to the sequence of digits.

4. The method of claim 1, wherein revising the initial score for a first candidate word sequence of the plurality of candidate word sequences comprises accounting for a probability of occurrence of a semantic class hypothesized for the detected words corresponding to the sequence of digits in the first candidate word sequence.

5. The method of claim 1, wherein revising the initial scores comprises applying a set of one or more rules to restrict which tokens are valid for a particular semantic class.

6. The method of claim 1, further comprising generating a new candidate word sequence for automatic speech recognition of the input utterance based at least in part on the one or more hypotheses that the words corresponding to the sequence of digits belong to the one or more semantic classes.

7. The method of claim 1, wherein the one or more semantic classes include a defined class that only includes digit sequence tokens.

8. At least one non-transitory computer-readable storage medium encoded with computer-executable instructions that, when executed, perform a method comprising:
   receiving a free-text input utterance to be recognized;
   applying a statistical language model to the free-text input utterance to obtain a plurality of candidate word sequences for automatic speech recognition of the input utterance, each of the plurality of candidate word sequences having a corresponding initial score generated by the statistical language model;
   for one or more of the plurality of candidate word sequences,
      detecting words corresponding to a sequence of digits, and
      analyzing the detected words corresponding to the sequence of digits, using at least one processor, to generate one or more hypotheses that the words corresponding to the sequence of digits belong to one or more semantic classes, and to determine a separate score for each of the one or more hypotheses indicating a probability that the words corresponding to the sequence of digits belong to the semantic class;
   revising the initial scores for each of the one or more plurality of candidate word sequences, wherein revising the initial score for each of the one or more plurality of candidate word sequences comprises computing a revised score for the respective candidate word sequence based, at least in part, on the separate scores determined for the one or more hypotheses generated for each of the one or more semantic classes;

selecting, from among the plurality of candidate word sequences, a best-scoring candidate word sequence using the revised scores; and outputting the best-scoring candidate word sequence as an output recognized word sequence for the input utterance.

9. The at least one non-transitory computer-readable storage medium of claim 8, wherein the one or more semantic classes are selected from the group consisting of: a year class, a date class, a date of birth class, a social security number class, a blood pressure class, a telephone number class, a postal code class, a street address class, a time of day class, a driver's license number class, a license plate class, a passport number class, an account number class, a card number class, a policy number class, an ISBN class, a road number class, a flight number class, a train number class, an airport gate number class, a latitude class, a longitude class, and an altitude class.

10. The at least one non-transitory computer-readable storage medium of claim 8, wherein revising the initial score for a first candidate word sequence of the plurality of candidate word sequences comprises accounting for a probability of occurrence of the detected words corresponding to the sequence of digits in the first candidate word sequence conditioned on occurrence of a semantic class hypothesized for the detected words corresponding to the sequence of digits.

11. The at least one non-transitory computer-readable storage medium of claim 8, wherein revising the initial score for a first candidate word sequence of the plurality of candidate word sequences comprises accounting for a probability of occurrence of a semantic class hypothesized for the detected words corresponding to the sequence of digits in the first candidate word sequence.

12. The at least one non-transitory computer-readable storage medium of claim 8, wherein revising the initial scores comprises applying a set of one or more rules to restrict which tokens are valid for a particular semantic class.

13. The at least one non-transitory computer-readable storage medium of claim 8, wherein the method further comprises generating a new candidate word sequence for automatic speech recognition of the input utterance based at least in part on the one or more hypotheses that the words corresponding to the sequence of digits belong to the one or more semantic classes.

14. The at least one non-transitory computer-readable storage medium of claim 8, wherein the one or more semantic classes include a defined class that only includes digit sequence tokens.

15. Apparatus comprising:
at least one processor; and
at least one storage medium storing processor-executable instructions that, when executed by the at least one processor, cause the at least one processor to perform a method comprising:
receiving a free-text input utterance to be recognized;
applying a statistical language model to the free-text input utterance to obtain a plurality of candidate word sequences for automatic speech recognition of the input utterance, each of the plurality of candidate word sequences having a corresponding initial score generated by the statistical language model;
for one or more of the plurality of candidate word sequences,
detecting words corresponding to a sequence of digits, and
analyzing the detected words corresponding to the sequence of digits, using at least one processor, to generate one or more hypotheses that the words corresponding to the sequence of digits belong to one or more semantic classes, and to determine a separate score for each of the one or more hypotheses indicating a probability that the words corresponding to the sequence of digits belong to the semantic class;
revising the initial scores for each of the one or more plurality of candidate word sequences, wherein revising the initial score for each of the one or more plurality of candidate word sequences comprises computing a revised score for the respective candidate word sequence based, at least in part, on the separate scores determined for the one or more hypotheses generated for each of the one or more semantic classes;
selecting, from among the plurality of candidate word sequences, a best-scoring candidate word sequence using the revised scores; and
outputting the best-scoring candidate word sequence as an output recognized word sequence for the input utterance.

16. The apparatus of claim 15, wherein revising the initial score for a first candidate word sequence of the plurality of candidate word sequences comprises accounting for a probability of occurrence of the detected words corresponding to the sequence of digits in the first candidate word sequence conditioned on occurrence of a semantic class hypothesized for the detected words corresponding to the sequence of digits.

17. The apparatus of claim 15, wherein revising the initial score for a first candidate word sequence of the plurality of candidate word sequences comprises accounting for a probability of occurrence of a semantic class hypothesized for the detected words corresponding to the sequence of digits in the first candidate word sequence.

18. The apparatus of claim 15, wherein the one or more semantic classes are selected from the group consisting of: a year class, a date class, a date of birth class, a social security number class, a blood pressure class, a telephone number class, a postal code class, a street address class, a time of day class, a driver's license number class, a license plate class, a passport number class, an account number class, a card number class, a policy number class, an ISBN class, a road number class, a flight number class, a train number class, an airport gate number class, a latitude class, a longitude class, and an altitude class.

19. The apparatus of claim 15, wherein the method further comprises generating a new candidate word sequence for automatic speech recognition of the input utterance based at least in part on the hypotheses that the words corresponding to the sequence of digits belong to the one or more semantic classes.

20. The apparatus of claim 15, wherein the one or more semantic classes include a defined class that only includes digit sequence tokens.

* * * * *